(12) United States Patent
Aharoni (10) Patent No.: US 8,935,109 B2
(45) Date of Patent: Jan. 13, 2015

(54) SYSTEM FOR PREVENTING AND DETECTING FUEL THEFT

(76) Inventor: Peleg Aharoni, Kiryat Ono (IL)

( * ) Notice: Subject to any disclaimer, the term of this patent is extended or adjusted under 35 U.S.C. 154(b) by 497 days.

(21) Appl. No.: 13/391,409

(22) PCT Filed: Aug. 25, 2010

(86) PCT No.: PCT/IL2010/000696
§ 371 (c)(1),
(2), (4) Date: Feb. 21, 2012

(87) PCT Pub. No.: WO2011/024169
PCT Pub. Date: Mar. 3, 2011

(65) Prior Publication Data
US 2012/0150456 A1    Jun. 14, 2012

(30) Foreign Application Priority Data
Aug. 30, 2009 (IL) .......................................... 200631

(51) Int. Cl.
*G06F 19/00* (2011.01)
*B60K 15/04* (2006.01)
*B60K 15/03* (2006.01)

(52) U.S. Cl.
CPC ... *B60K 15/0403* (2013.01); *B60K 2015/03197* (2013.01); *B60K 2015/03217* (2013.01); *B60K 2015/0319* (2013.01)
USPC ......................................................... 702/55

(58) Field of Classification Search
CPC .... B60R 25/04; A61K 31/485; A61K 9/0043; A61K 9/006
USPC .......................................................... 702/55
See application file for complete search history.

(56) References Cited

U.S. PATENT DOCUMENTS

| | | | |
|---|---|---|---|
| 1,911,987 A | 5/1933 | Casey | |
| 4,253,690 A * | 3/1981 | Hollander | ..................... 292/354 |
| 4,361,835 A | 11/1982 | Nagy | |
| 5,950,692 A | 9/1999 | George et al. | |
| 6,260,544 B1 | 7/2001 | Spry et al. | |
| 8,600,653 B2 * | 12/2013 | Elkaim et al. | ................. 701/123 |
| 2001/0018639 A1 | 8/2001 | Bunn | |
| 2006/0111851 A1 * | 5/2006 | Potgieter et al. | ................ 702/35 |
| 2008/0156800 A1 | 7/2008 | Mougenot | |
| 2009/0216400 A1 | 8/2009 | Larsen et al. | |

* cited by examiner

*Primary Examiner* — Edward Raymond
(74) *Attorney, Agent, or Firm* — Mark M. Friedman (57) ABSTRACT

In one aspect, the present invention is directed to a system for preventing and detecting fuel theft from a fuel tank, the system comprising: a perforated casing (18), to be installed into the fuel inlet (28) of the fuel tank, the casing adapted to prevent a pipe from passing therethrough into the tank; a door (14), disposed at the opening (30) of the perforated casing, for blocking in the closed state thereof the inlet (30) to the fuel tank; a safety-catch mechanism, for retaining the door closed when the tank comprises more than a predefined quantity of fuel or to allow opening of the door just when the net is uplifted to the height of the top of the tank.

27 Claims, 7 Drawing Sheets

SYSTEM FOR PREVENTING AND DETECTING FUEL THEFT

FIELD OF THE INVENTION

The present invention relates to the field of preventing and detecting fuel theft. More particularly, the present invention is directed to a system for preventing and detecting fuel theft.

BACKGROUND OF THE INVENTION

The phenomenon of stealing liquid fuel (such as diesel) from fuel tanks is well known. Such thefts occur from vehicle tanks as well as from fuel containers.

One of the reasons that fuel theft happens despite the fact that the phenomenon is well known is that some of the thieves operate from the inside, such as truck drivers. Having legal access to the fuel tank of his truck, the driver retains the key for the fuel tank of his truck, and as such, has the opportunity to siphon some fuel without being noticed.

A prior art solution to such thefts is placing a net (block) inside the fuel tank near its inlet. On the one hand, the net prevents a pumping pipe (nozzle) from reaching the tank bottom; but on the other hand, since some space must be accorded for the fueling nozzle, the net cannot be placed at the entrance of the tank inlet, but deeper. This gap allows drawing some 40-50 liters of the fuel from the tank when full, such.

It is an object of the present invention to provide a solution to the above-mentioned and other problems of the prior art.

Other objects and advantages of the invention will become apparent as the description proceeds.

SUMMARY OF THE INVENTION

In one aspect, the present invention is directed to a system for preventing and detecting fuel theft from a fuel tank, the system comprising:
  a perforated casing (18), to be installed into the fuel inlet (28) of the fuel tank, the casing adapted to prevent pipe passage therethrough into the tank;
  a door (14), disposed at the opening (30) of the perforated casing (18), for blocking in the closed state thereof the inlet (30) to the fuel tank;
  a safety-catch mechanism, for retaining the door closed when the tank comprises more than a predefined quantity of fuel.

According to one embodiment of the invention, the safety-catch mechanism is substantially a mechanical mechanism, thereby obtaining low amortization rate.

According to another embodiment of the invention, the safety-catch mechanism is substantially an electro-mechanical mechanism, thereby obtaining a simple structure.

In a preferred embodiment of the invention, the safety-catch mechanism comprises:
  an excenter (42), connected to the door (14) such that when the door being closed, the excenter evacuates a space (48), and when the door being opened, the excenter fills the space;
  a float (20), disposed in the fuel tank;
  a rod (36) connected to the float (20), the vertical location of the rod being dependent on the fuel level in the tank;
  wherein the rod being located under the space (48) thereby when the door is closed and the fuel level in the tank is beyond a certain level, the rod (36) occupying the space thereby preventing from the excenter to return back.

Figure 5:
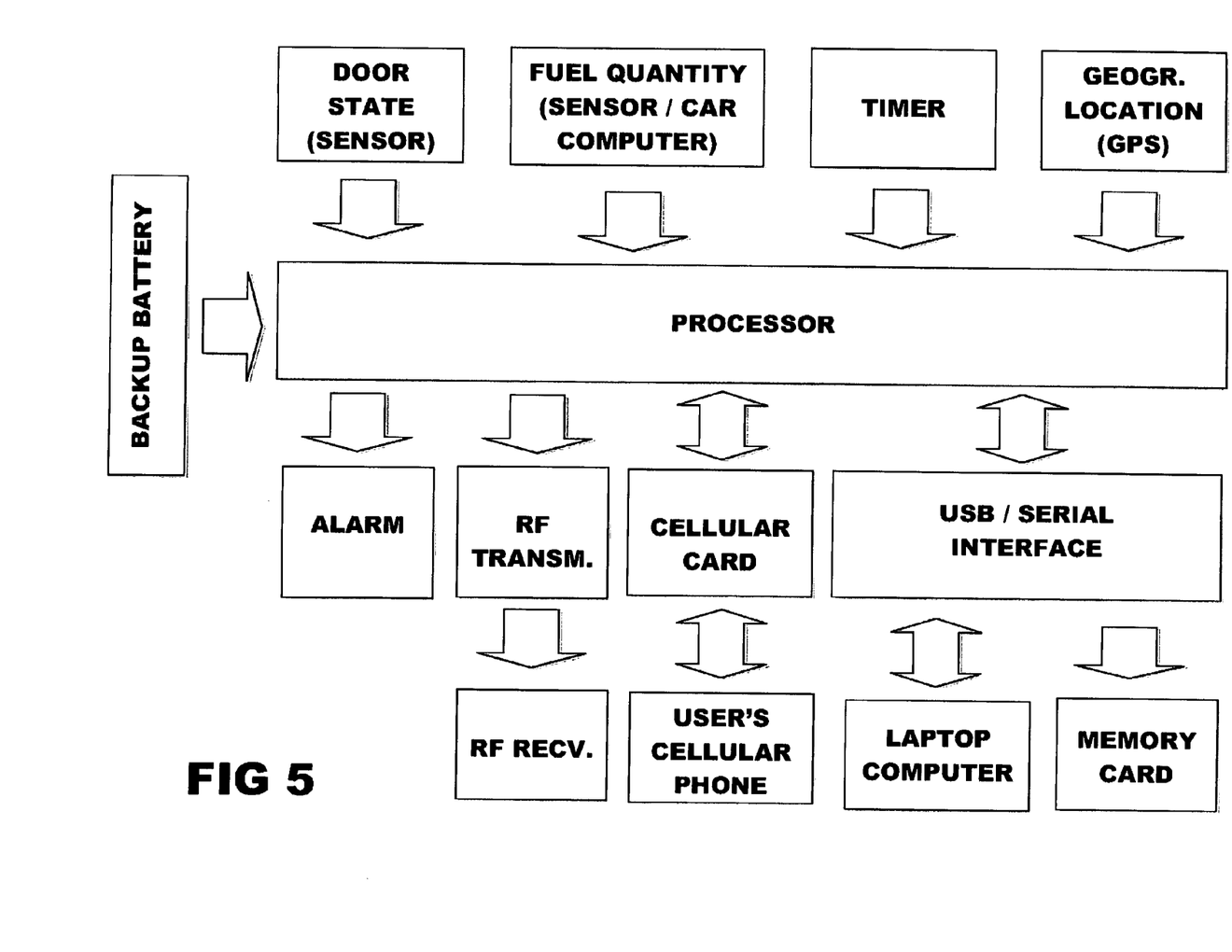
FIG. 5 is a block diagram of a system for alerting of fuel theft, according to one embodiment of the invention.

The system may further comprise a module for detecting fuel theft (illustrated in FIG. 5). Such a module may comprise:
  a first sensor (44), for detecting whether door (14) is open or closed;
  one or more additional sensors, for detecting or metering additional information upon which fuel theft can be detected;
  a processor, for detecting a situation of fuel theft from the information obtained by the sensors; and
  an output mechanism.

The additional sensors may comprise a fuel quantity sensor (26), for determining fuel theft if the quantity of fuel in the tank decreases while door (14) is open or in any case as defined in code embedded in the processor.

The output mechanism may comprise an alarm; an interface with a computer; an interface with a memory card; a cellular card, for allowing informing a user in real time of fuel theft, and so forth.

According to one embodiment of the invention, the sensor is substantially based on a capacitor.

According to another embodiment of the invention, the sensor is substantially based on a float.

The foregoing embodiments of the invention are described and illustrated in conjunction with systems and methods thereof, which are meant to be merely illustrative, and not limiting.

BRIEF DESCRIPTION OF THE DRAWINGS

Embodiments and features of the present invention are described herein in conjunction with the following drawings.

It should be understood that the drawings are not necessarily drawn to scale.

DETAILED DESCRIPTION OF PREFERRED EMBODIMENTS

The present invention will be understood from the following detailed description of preferred embodiments, which are meant to be descriptive and not limiting. For the sake of brevity, some well-known features, methods, systems, procedures, components, circuits, and so on, are not described in detail.

Figure 1:
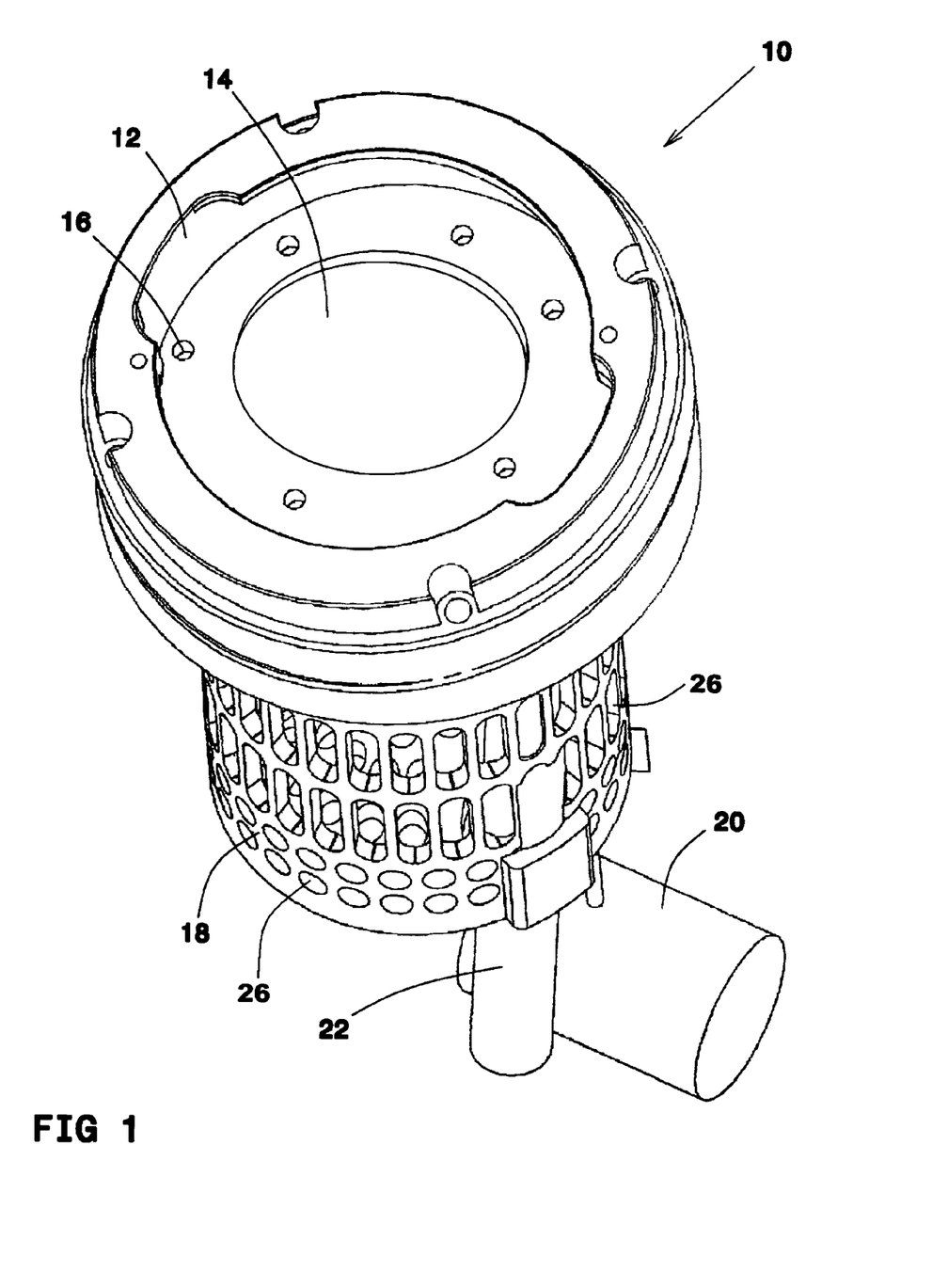
FIG. 1 is a perspective view schematically illustrating an apparatus for preventing fuel theft, according to one embodiment of the invention.

FIG. 1 is a perspective view schematically illustrating an apparatus for preventing fuel theft, according to one embodiment of the invention.

Figure 2:
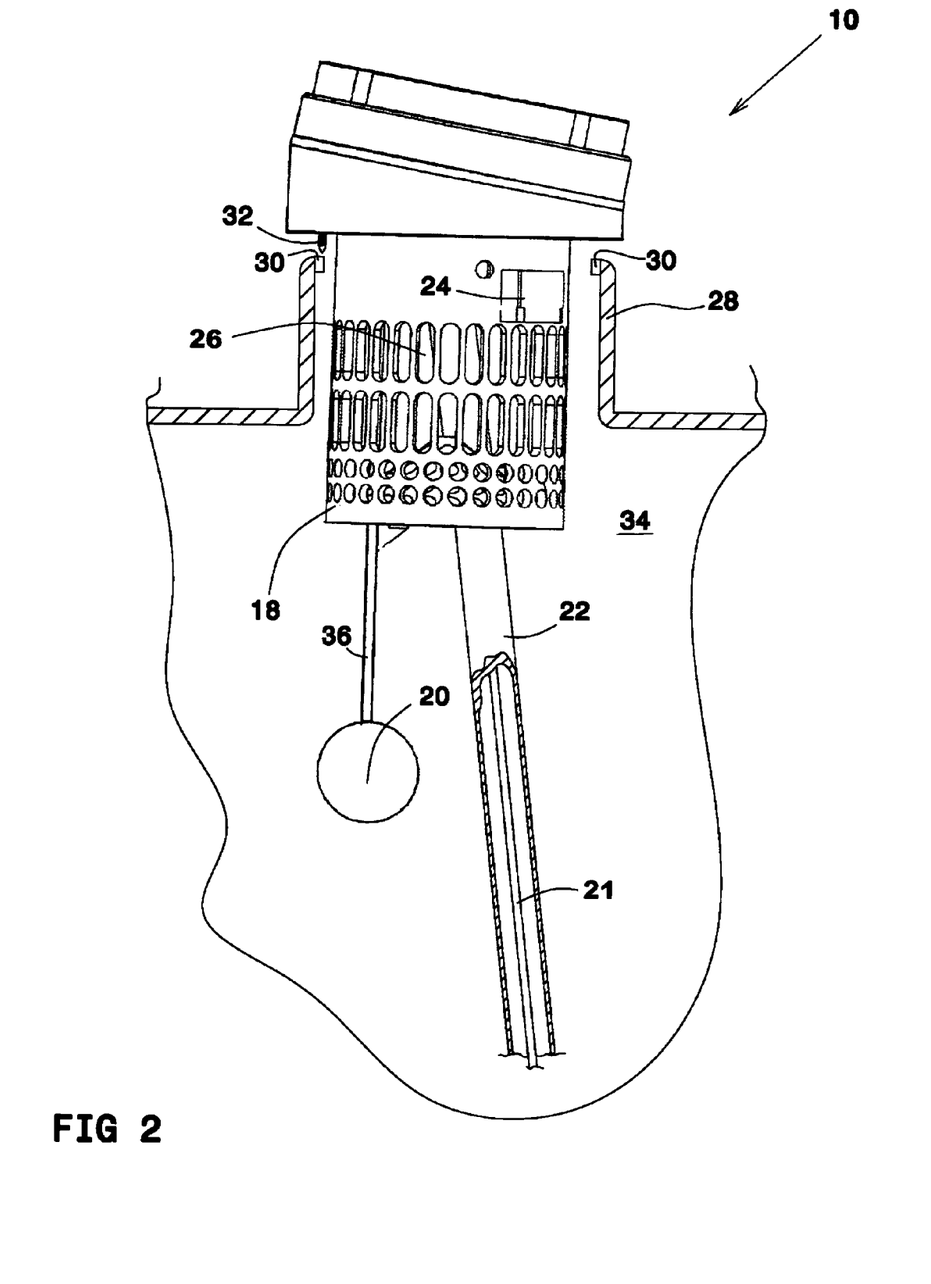
FIG. 2 is a sectional view schematically illustrating the apparatus for preventing fuel theft of FIG. 1.

FIG. 2 is a sectional view schematically illustrating the apparatus for preventing fuel theft of FIG. 1.

Figure 3:
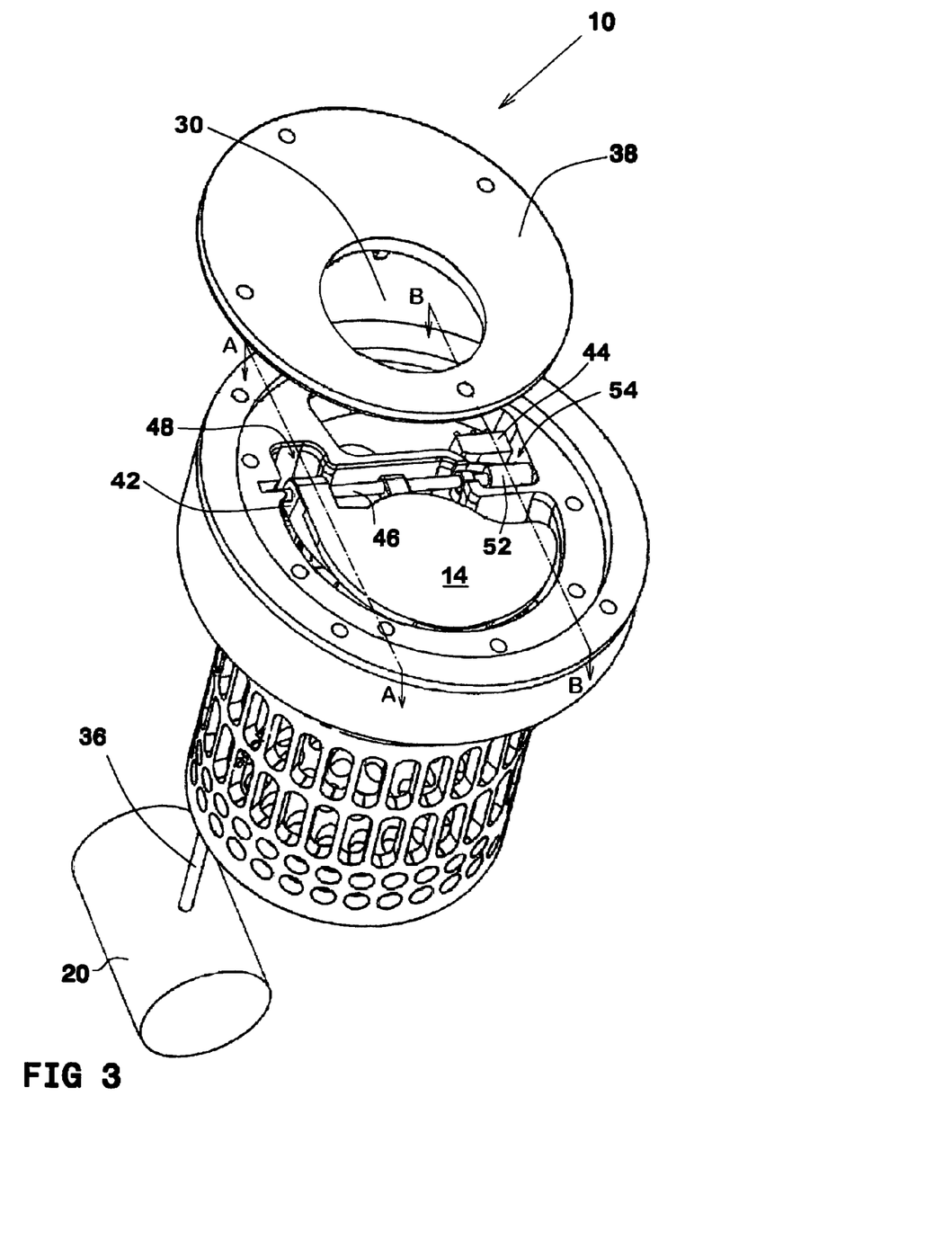
FIG. 3 is an exploded view of the apparatus for preventing fuel theft of FIG. 1.

FIG. 3 is an exploded view of the apparatus for preventing fuel theft of FIG. 1.

Figure 4A:
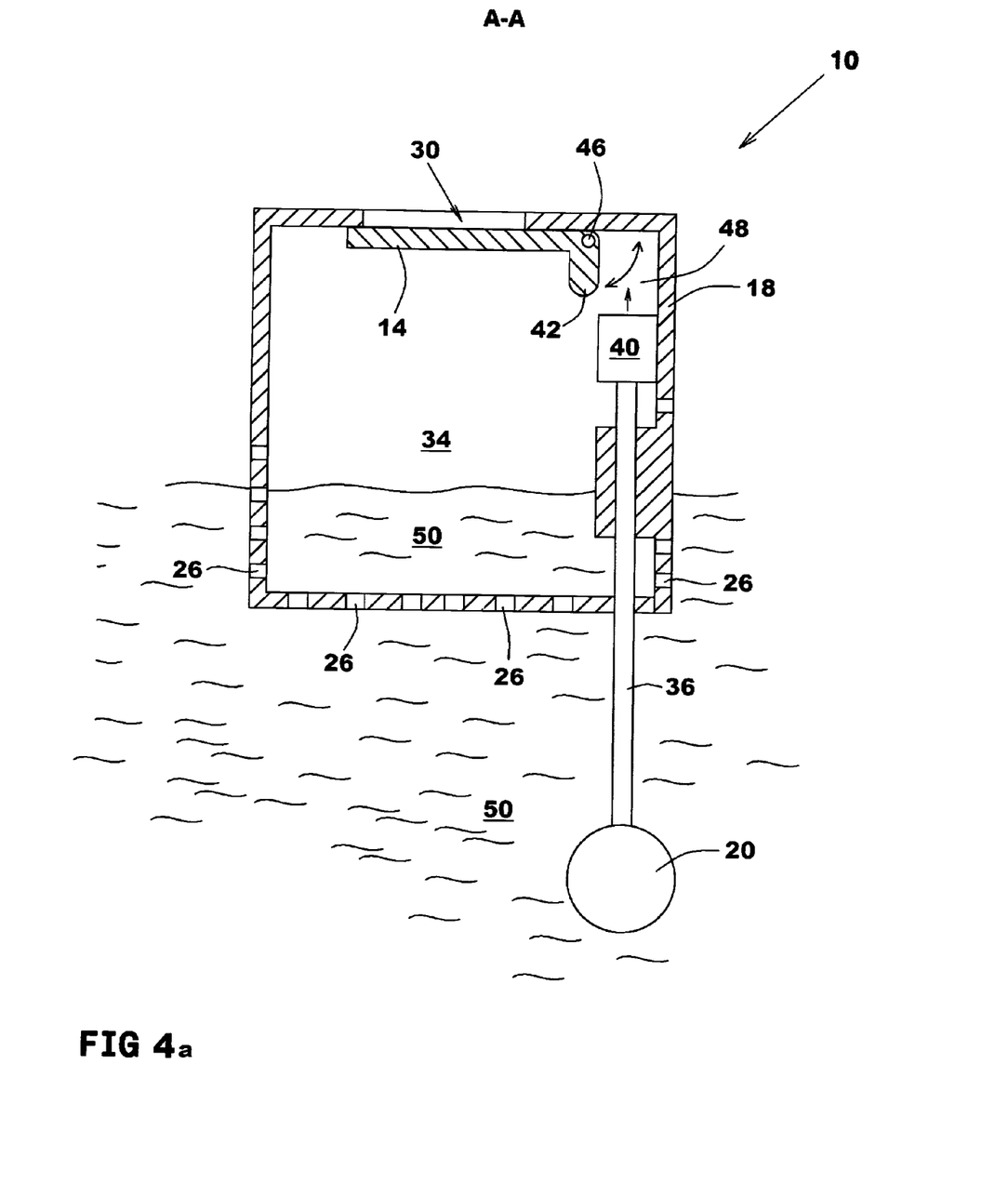
FIG. 4a is a diagram schematically illustrating the operation principle of an apparatus for preventing fuel theft, according to one embodiment of the invention.

FIG. 4a is a diagram schematically illustrating the operation principle of an apparatus for preventing fuel theft, according to one embodiment of the invention. The diagram is associated with cross section A-A of FIG. 3. It is not a true cross section, but rather a diagram.

Apparatus 10 comprises a casing 18, in the form of a net, i.e., comprises bores 26. The apparatus is installed in a fuel inlet 30 of a fuel tank, and fixed to its position by bolts 32, each passing through a bore 16. Bolts 32 are preferably shearing bolts, i.e., the head thereof shears upon rotating the bolt beyond a certain point, thereby preventing reverse rotation, thereby preventing extracting the bolt.

A door 14 is disposed on inlet 30 to the fuel tank. Door 14 is rotatable along axle 46. Numeral 42 denotes an excenter, i.e., an element rotating along an axis that is not at the center thereof. In this case, the mechanical embodiment of the axis is axle 46. The arched arrow demonstrates the rotation direction of the door/excenter around the axis of axle 46.

Reference numeral 20 denotes a float, which is pushed up by the fuel in the tank. A vertical rod 36 is connected to float 20.

Assuming door 30 is closed, when the fuel inside the tank is beyond a certain limit, it pushes end 40 of rod 36 into space 48, thereby preventing opening door 14. Thus, this mechanism operates as a safety-catch that prevents door 14 from opening, and as such, fuel theft is prevented.

Practically, in a gas station the tank is refilled with fuel, usually until the tank is full. When the tank is not full, door 14 is openable, and as such, a fueling nozzle (not illustrated) can be instated into space 34 of apparatus 10. Upon lifting up the fueling nozzle, door 14 closes, and end 40 of rod 36 prevents opening door 14. The door will be openable again when the fuel quantity decreases from a certain level. However, in this situation, the perforated casing 18 prevents inserting a pipe inside the tank, and no fuel is present in the level of the bottom of perforated casing 18 (net).

Thus, according to this embodiment of the invention, the apparatus for preventing fuel theft comprises:
- a perforated casing, to be installed into the fuel inlet of a fuel tank. The perforations are used for allowing fuel passage therethrough. The bottom of the casing is used for preventing a pipe entrance into the tank, beyond the bottom, as cautionary means against fuel thieves;
- a door, connected to the casing at the entry thereof, for blocking/unblocking the inlet to the fuel tank;
- a safety-catch mechanism, for retaining the door closed when the tank is full of fuel, and actually, when the tank comprises more than a certain quantity of fuel.

The door in FIG. 4a is in its closed state. In order to keep the door in this state, a spring (not illustrated) can be used. Of course, this is merely an example, and other mechanisms can be used for retaining the door in its closed state.

According to another embodiment of the invention (not illustrated), the safety-catch is implemented by electro-mechanical mechanism. For example, whenever the fuel level in the tank passes a certain threshold (e.g., 70% of its capacity), an electro-mechanical mechanism pushes the door closed, and when a sensor indicates that the door is closed, an electro-mechanical safety-catch locks the door.

According to one embodiment of the invention, the safety-catch is located constantly at the top of the fuel tank while the entire mechanism can move up and down on the vertical axe thus allowing door 14 to be opened only when the bottom of net 18 is at the height of the top of the tank meaning fuel can not be stolen.

Figure 4B:
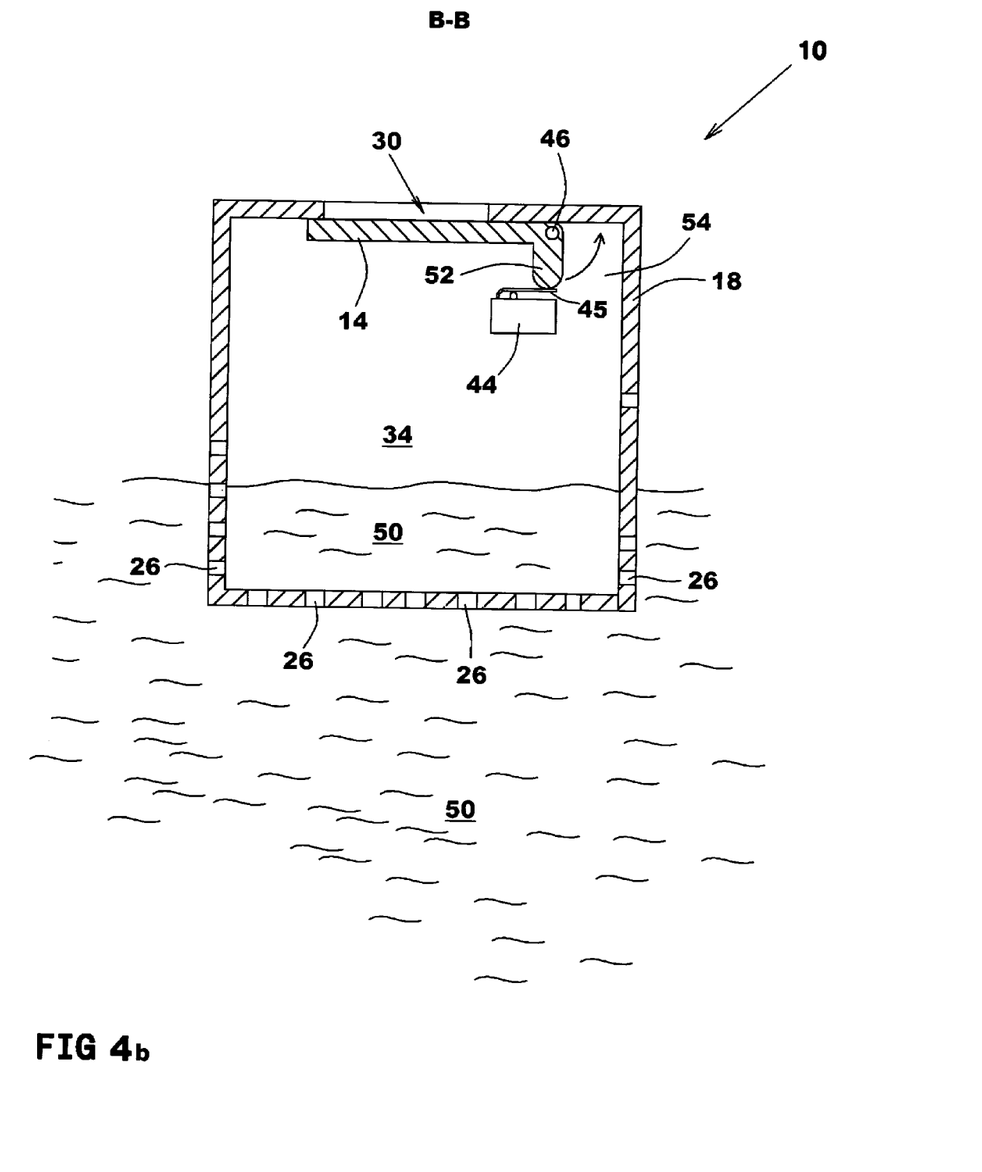
FIG. 4b is a diagram schematically illustrating the operation principle of a switch that indicates if door 14 is closed or open, according to one embodiment of the invention.

FIG. 4b is a diagram schematically illustrating the operation principle of a switch that indicates if door 14 is closed or open, according to one embodiment of the invention. The diagram is associated with cross section B-B of FIG. 3. It is not a true cross section, but rather a diagram.

According to this embodiment, switch 44 may be used for detecting the state of the door: closed/open. In the closed state, excenter 52 applies force on arm 45 switch 44. In the opened state, there is no contact between arm 45 and excenter 52.

The use of such information is detailed hereinafter.

The embodiments illustrated in FIGS. 1 to 4a are directed to fuel theft prevention. However, the ability to detect fuel theft, especially in real time, can threaten potential thieves.

FIG. 5 is a block diagram of a system for alerting of fuel theft, according to one embodiment of the invention.

The system employs a processor, which concentrates information from sensors, analyzes the possibility of theft from the input of these sensors, and when attempted fuel theft is suspected, alerts the user thereof.

The information provided to the processor can be, for example:
- The fuel quantity in the tank. This information can be obtained from the vehicle's computer; by connecting to the vehicle's systems, such as the module that measures the fuel quantity; an additional sensor thereof, such as based on a float or a capacitor; and so on.
- Geographical location. The geographical location can be obtained from a GPS (Geographical Positioning System), which is already installed in some vehicles, or can be added.
- The state of the door of apparatus 10. The state of the door, i.e., open or closed, can be indicated, for example, by a sensor, such as switch 44 in FIG. 4.
- A timer.

Of course, these are merely examples, and other input sources can be used.

The output of the processor can be data provided, for example, to:
- A laptop computer or to a mobile memory (such as Disk-On-Key®).
- A cellular card, i.e., a device that comprises the ability to communicate through a cellular network. For example, upon detecting fuel theft in real time, the processor initiates transmission of an SMS (Short Messaging System) message to the owner of the tank.
- An RF (Radio Frequency) transmitter.
- An alarm system. The alarm system can generate or activate an audial signal via the horn of the vehicle in which the fuel tank is installed.
- A memory card, such as Disk-On-Key®.
- An Web server over the Internet, email address, IP address, and so on.

Figure 6:
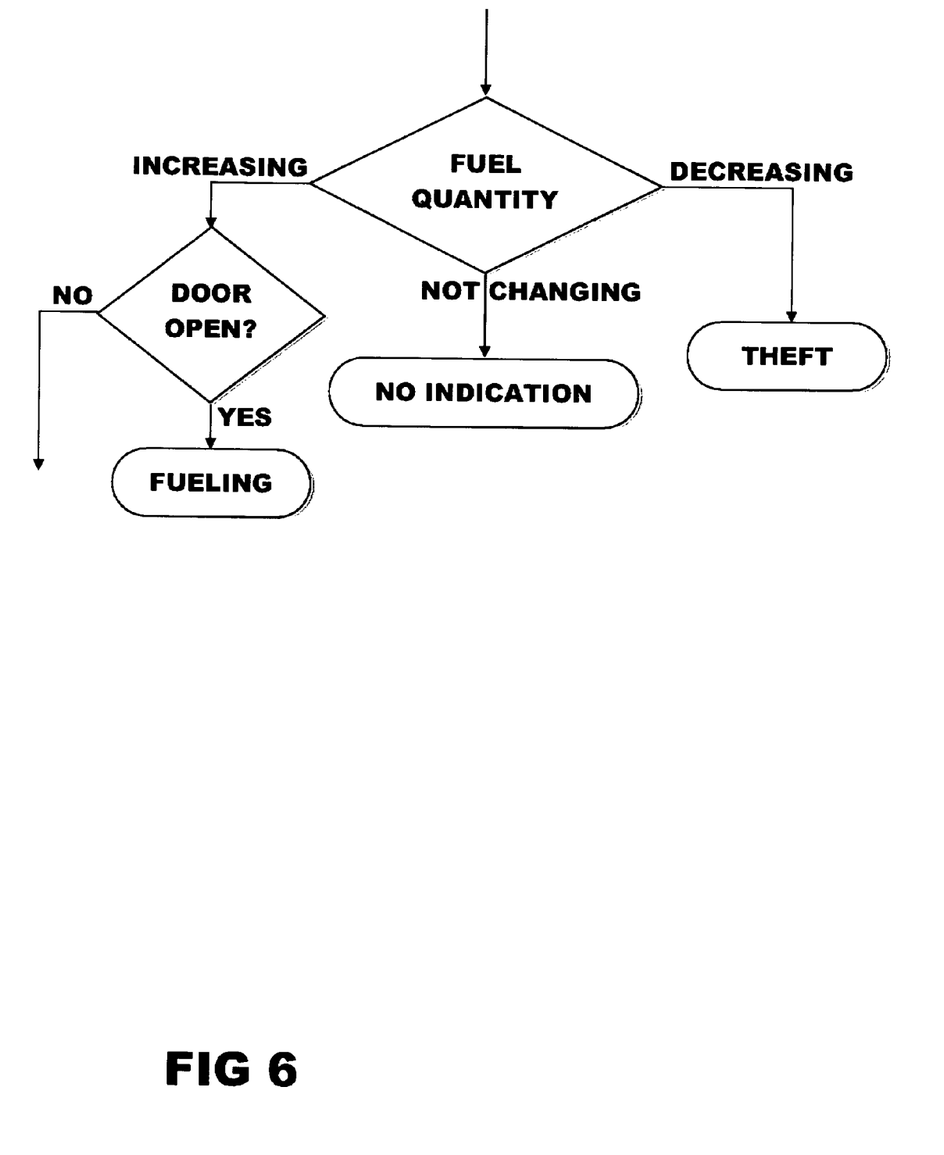
FIG. 6 schematically illustrates a method for indicating fuel theft from a fuel tank, according to one embodiment of the invention.

FIG. 6 schematically illustrates a method for indicating fuel theft from a fuel tank, according to one embodiment of the invention.

It is assumed that the code executed by the processor (illustrated in FIG. 5) distinguishes between regular consumption of fuel and fuel theft.

According to this method, upon indicating (e.g., by switch 44) that door 14 is open, the fuel quantity in the tank is traced (e.g., by monitoring the fuel quantity via the fuel quantity sensor of the vehicle or by the added sensor 22). If the quantity increases, it means that the tank has been refueled; however, if the quantity decreases, it means that fuel has been removed from the tank. In the case of a car's tank, there is no sensible reason for such an event, and in this case, an alarm procedure is a reasonable step.

Quantity sensor 22 operates as follows: The sensor comprises a tube and a pole 21 disposed inside the tube, along the tube. The tube is open in its upper side, thereby allowing liquid to fill the space between the tube and pole 21 up to the liquid level in the tank. Assuming both the tube and the pole are made of metal, the liquid that fills the space provides some electrical characteristics, such as changes the capacity or resistance between the pole and the tube. This allows metering the level of the fluid in the tank.

The alarm can sound a siren, sending an SMS message to the user (the owner of the vehicle), and so on.

According to another example, the invention is implemented in a vehicle, and whenever door 14 opens and closes without refueling, the event is registered and the siren will sound. In addition, if the door opens when the tank is full, it can indicate fuel theft.

Preferably, the fuel quantity is metered by a capacitive sensor, which is capable of metering the fuel level in a tank with a relatively high accuracy, in comparison to other fuel metering technologies. Alternatively, in a vehicle, the fuel level/quantity in the tank can be obtained from the vehicle's computer.

One meaningful advantage of the present invention is that the apparatus 10 can be installed in a tank without changing the structure of the tank or vehicle. Another meaningful advantage is that the state of the door cannot be manipulated as if to be left open after refueling without being noticed by switch 44. Positioning the safety catch mechanism fixed at the top of the tank prevents in a mechanical manner the option to manipulate the state of door 14 and upgrades significantly the resistance of the system to fuel thefts.

Employing shearing bolts for attaching apparatus 10 to fuel inlet 30 of a tank prevents removal of the apparatus. Thus, once the apparatus has been installed into a fuel tank, an attempt to remove it will leave a trail.

In a vehicle, use of a backup battery (not illustrated) may be helpful.

In the figures and/or description herein, the following reference numerals have been mentioned:

numeral 10 denotes an apparatus for preventing fuel theft from a fuel tank, according to one embodiment of the invention;
numeral 12 denotes thread slots;
numeral 14 denotes a door that locks when the fuel quantity in the tank is greater than a certain level;
numeral 16 denotes a bore through which is threaded a bolt for connecting apparatus 10 to the tank;
numeral 18 denotes a perforated casing (also referred herein as net) for preventing entrance of a pipe into the tank (thereby preventing fuel theft);
numeral 20 denotes a float;
numeral 21 denotes a pole, disposed inside a tube of sensor 22;
numeral 22 denotes a sensor that measures the quantity of fuel in the tank;
numeral 24 denotes a salient (used for placing apparatus 10 in a desired position);
numeral 26 denotes net bores;
numeral 28 denotes the inlet to the tank;
numeral 30 denotes the opening of the inlet to the tank;
numeral 32 denotes a shearing bolt (the head thereof shears upon rotating the bolt beyond a certain point, thereby preventing extracting the bolt);
numeral 34 denotes the interior of the tank;
numeral 36 denotes a rod used as a safety-catch;
numeral 38 denotes a washer used as the top part of apparatus 10;
numeral 40 denotes the end of rod 36;
numeral 42 denotes an excenter;
numeral 44 denotes a switch;
numeral 45 denotes an arm of switch 44;
numeral 46 denotes an axle;
numeral 48 denotes a depression;
numeral 50 denotes fuel;
numeral 52 denotes an excenter; and
numeral 54 denotes a depression.

The foregoing description and illustrations of the embodiments of the invention has been presented for the purposes of illustration. It is not intended to be exhaustive or to limit the invention to the above description in any form.

Any term that has been defined above and used in the claims, should to be interpreted according to this definition.

What is claimed is:

1. A system for preventing and detecting fuel theft from a fuel tank, the system comprising:
   a perforated casing, to be installed into the fuel inlet of said fuel tank, said casing adapted to prevent a pipe from passing therethrough into said tank;
   a door, disposed at the opening of said perforated casing, for blocking in the closed state thereof the inlet to the fuel tank;
   a safety-catch mechanism, for retaining said door closed when said tank comprises more than a predefined quantity of fuel,
   the system adaptable to be installed in the fuel tank without changing the structure of the fuel tank.

2. A system according to claim 1, wherein said safety-catch mechanism is substantially a mechanical mechanism, thereby obtaining a low amortization rate.

3. A system according to claim 1, wherein said safety-catch mechanism is substantially an electro-mechanical mechanism, thereby obtaining a simple structure.

4. A system according to claim 1, wherein said safety-catch mechanism comprises
   an excenter, connected to said door such that when said door being closed, said excenter evacuates a space, and when said door being opened, said excenter fills said space,
   a float, disposed in said fuel tank;
   a rod connected to said float, the vertical location of said rod being dependent on the fuel level in said tank;
   wherein said rod being located under said space thereby when said door is closed and the fuel level in said tank is beyond a certain level, said rod occupying said space thereby preventing from said excenter to return back.

5. A system according to claim 1, wherein said safety-catch is fixed at the top of the tank, while said perforated casing is movable vertically up and down.

6. A system according to claim 1, further comprising a module for detecting fuel theft comprising
   a first sensor, for detecting whether said door is open or closed;
   one or more additional sensors, for detecting or metering additional information upon which fuel theft can be detected;
   a processor, for detecting a situation of fuel theft from the information obtained by said sensors; and
   an output mechanism.

7. A system according to claim 6, wherein said one or more additional sensors comprise a fuel quantity sensor, for determining fuel theft if the quantity of fuel in said tank decreases while said door is open.

8. A system according to claim 6, wherein said one or more additional sensors comprise a fuel quantity sensor, for determining fuel theft if said door opens while said tank is full or comprises a predetermined quantity of fuel.

9. A system according to claim 6, wherein said one or more additional sensors comprise a timer, for determining fuel theft if said door opens during a predetermined period after fueling.

10. A system according to claim 6, wherein said output mechanism comprises at least one of an alarm and an SMS.

11. A system according to claim 6, wherein said output mechanism comprises a cellular card, for allowing informing a user in real time of fuel theft.

12. A system according to claim 6, wherein said sensor is substantially based on a capacitor.

13. A system according to claim 6, wherein said sensor is substantially based on a float.

14. A system according to claim 6, wherein said sensors are located in the fuel inlet.

15. A system for preventing and detecting fuel theft from a fuel tank of a vehicle, the system comprising:
  a perforated casing, to be installed into the fuel inlet of said fuel tank, said casing adapted to prevent a pipe from passing therethrough into said tank;
  a door, disposed at the opening of said perforated casing, for blocking in the closed state thereof the inlet to the fuel tank;
  a module for detecting fuel theft comprising:
  a first sensor, for detecting whether said door is open or closed;
  a fuel quantity sensor, for determining a quantity of fuel in the fuel tank;
  a processor for receiving information from the first sensor and from the fuel quantity sensor, the processor, for detecting a situation of fuel theft from the information obtained by said sensors;
  an output mechanism,
  the system adaptable to be installed in the fuel tank without changing the structure of the fuel tank.

16. The system of claim 15, further comprising the processor for detecting a situation of fuel theft if at least one of the following is true: (i) said information from the sensors indicates that the quantity of fuel in the fuel tank decreases while said door is open; and (ii) said information from the sensors indicates said the quantity of fuel in the fuel tank does not increase during a time in which said door opens and closes.

17. The system of claim 15, further comprising
  a GPS sensor, the processor receiving information from the GPS allowing the processor to calculate a distance traveled by the vehicle since a refueling and to calculate a regular consumption of fuel based on the distance traveled
  the processor for detecting a situation of fuel theft if said information from the sensors indicates at least one of the following is true:
    (i) said information from the sensors indicates that the quantity of fuel in the fuel tank decreases while said door open;
    (ii) said information from the sensors indicates said the quantity of fuel in the fuel tank does not increase during a time in which said door opens and closes;
    (iii) that the quantity of fuel in the fuel tank decreases by an amount inconsistent with regular consumption of the fuel through the vehicle travelling the distance.

18. The system of claim 15, further comprising
  a GPS sensor, the processor receiving information from the GPS allowing the processor to calculate a distance traveled by the vehicle since a refueling and to calculate a regular consumption of fuel based on the distance traveled
  the processor for detecting a situation of fuel theft if said information from the sensors indicates that the quantity of fuel in the fuel tank decreases by an amount inconsistent with regular consumption of the fuel through the vehicle travelling the distance and that at least one of the following is true:
    (i) said information from the sensors indicates that the quantity of fuel in the fuel tank decreases while said door is open;
    (ii) said information from the sensors indicates said the quantity of fuel in the fuel tank does not increase during a time in which said door opens and closes.

19. The system of claim 15, further comprising
  the processor detecting a situation of fuel theft from the information obtained by said sensors if both of the following are true:
    (i) said information from the sensors indicates that the quantity of fuel in the fuel tank decreases while said door is open;
    (ii) said information from the sensors indicates said the quantity of fuel in the fuel tank does not increase during a time in which said door opens and closes.

20. The system of claim 15, further comprising
  the processor detecting a situation of fuel theft from the information obtained by said sensors if said information from the sensors indicates that the quantity of fuel in the fuel tank decreases while said door is open.

21. The system of claim 15, further comprising the processor detecting a situation of fuel theft from said information from the sensors if said information indicates said the quantity of fuel in the fuel tank does not increase during a time in which said door opens and closes.

22. The system of claim 15, wherein said sensor is substantially based on a capacitor.

23. The system of claim 15, wherein the output mechanism comprises at least one of an alarm and an SMS.

24. The system of claim 15, further comprising a timer, and wherein at least one of an alarm and an SMS is activated if said door opens during a predetermined period after fueling.

25. The system of claim 15, further comprising an alarm is activated when the first sensor indicates that the door is open and the GPS sensor indicates that the vehicle is travelling.

26. A system for preventing and detecting fuel theft from a fuel tank of a vehicle, the system comprising:
  a perforated casing, to be installed into the fuel inlet of said fuel tank, said casing adapted to prevent a pipe from passing therethrough into said tank;
  a door, disposed at the opening of said perforated casing, for blocking in the closed state thereof the inlet to the fuel tank;
  a module for detecting fuel theft comprising:
  an additional sensor;
  a fuel quantity sensor, for determining a quantity of fuel in the fuel tank;
  a processor for receiving information from the fuel quantity sensor and from the additional sensor, the processor receiving information from the additional sensor allowing the processor to calculate a distance traveled by the vehicle since a refueling and to calculate a regular consumption of fuel based on the distance traveled
  the processor for detecting a situation of fuel theft if said information from the additional sensor and the fuel quantity sensor indicate that the quantity of fuel in the fuel tank decreases by an amount inconsistent with regular consumption of the fuel through the vehicle travelling the distance;

an output mechanism comprising at least one of an alarm and an SMS, the system adaptable to be installed in the fuel tank without changing the structure of the fuel tank.

27. A system for preventing and detecting fuel theft from a fuel tank of a vehicle, the system comprising:

a perforated casing, to be installed into the fuel inlet of said fuel tank, said casing adapted to prevent a pipe from passing therethrough into said tank;

a door, disposed at the opening of said perforated casing, for blocking in the closed state thereof the inlet to the fuel tank;

a module for detecting fuel theft comprising:

an additional sensor for determining a condition indicating whether the dooms open or the door is closed;

a fuel quantity sensor, for determining a quantity of fuel in the fuel tank;

a processor for receiving information from the fuel quantity sensor and from the additional sensor, the processor for detecting a situation of fuel theft if said information from the additional sensor and the fuel quantity sensor indicate that the quantity of fuel in the fuel tank decreases while the condition of the door is closed;

an output mechanism comprising at least one of an alarm and an SMS, the system adaptable to be installed in the fuel tank without changing the structure of the fuel tank.

\* \* \* \* \*